United States Patent
Manchanda et al.

(10) Patent No.: US 9,596,687 B1
(45) Date of Patent: Mar. 14, 2017

(54) APERIODIC ANTENNA CALIBRATION TRIGGERING METHOD

(71) Applicant: Sprint Communications Company L.P., Overland Park, KS (US)

(72) Inventors: Nitesh Manchanda, Overland Park, KS (US); Walter Fred Rausch, Shawnee, KS (US); Sharath Somashekar, Overland Park, KS (US); Xianghong Zeng, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 120 days.

(21) Appl. No.: 14/339,848

(22) Filed: Jul. 24, 2014

(51) Int. Cl.
*H04W 72/04* (2009.01)
*H04W 24/08* (2009.01)
*H04W 16/28* (2009.01)

(52) U.S. Cl.
CPC ......... *H04W 72/046* (2013.01); *H04W 16/28* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 8,738,063 B1* | 5/2014 | Pawar | ................. | H04B 7/0413 455/522 |
| 2007/0232359 A1* | 10/2007 | Pinheiro | .............. | H04B 7/0695 455/562.1 |
| 2010/0150013 A1* | 6/2010 | Hara | ................... | H04L 25/0224 370/252 |
| 2013/0029592 A1* | 1/2013 | Yuda | ..................... | H04W 24/02 455/9 |
| 2013/0090128 A1* | 4/2013 | Sawamoto | ............ | H04W 24/02 455/452.2 |
| 2013/0217429 A1* | 8/2013 | Kimura | ................. | H04W 16/14 455/509 |
| 2013/0260693 A1* | 10/2013 | Un | ............................ | G01S 5/02 455/67.11 |
| 2014/0059218 A1* | 2/2014 | Ganu | .................... | H04W 76/04 709/224 |
| 2014/0108780 A1* | 4/2014 | Jin | ......................... | H04B 11/00 713/150 |
| 2015/0111569 A1* | 4/2015 | Gupta | ..................... | H04W 4/22 455/426.1 |

* cited by examiner

*Primary Examiner* — Derrick Ferris
*Assistant Examiner* — Jay Vogel

(57) ABSTRACT

A system, media, and method, for aperiodic antenna calibration triggering in a wireless network is provided. Following a calibration of an antenna, a recalibration of the antenna is triggered upon determining that a recalibration criterion is met. The determination is made based on monitoring a reported power level of a transmitted signal as measured by a stationary and/or mobile client device couple to the wireless network.

12 Claims, 5 Drawing Sheets

APERIODIC ANTENNA CALIBRATION TRIGGERING METHOD

SUMMARY

Embodiments of the invention are defined by the claims below, not this summary. A high-level overview of various aspects of the invention are provided here for that reason, to provide an overview of the disclosure and to introduce a selection of concepts that are further described below in the Detailed Description section. This Summary is not intended to identify key features or essential features of the claimed subject matter, nor is it intended to be used as an aid in isolation to determine the scope of the claimed subject matter.

In a first aspect, one or more non-transitory computer-readable media having storing computer-readable instructions embodied thereon that, when executed by a computing device, perform a of method a method of aperiodic antenna calibration triggering in a wireless network is provided. The method includes determining whether a minimum number of beam forming capable (BFC) mobile devices are present upon completion of an antenna calibration. The method also includes communicating a reference signal upon determining the minimum threshold of BFC mobile devices are present. The method also includes calculating an averaged power level based on a power level report received from each BFC mobile device representing a power level of the reference signal upon reception by the that BFC mobile device. The method also includes storing the averaged power level as a reference value. The method also includes determining whether a recalibration criterion has been satisfied based on a comparison of the current average power level reported by the BFC mobile devices with the reference value and triggering a second antenna calibration in response to that determination.

In another aspect, one or more non-transitory computer-readable media having storing computer-readable instructions embodied thereon that, when executed by a computing device, perform another method of aperiodic antenna calibration triggering in a wireless network is provided. The method includes communicating a reference signal to a stationary client device upon completion of an antenna calibration. The method also includes storing a reference value representing a power level of the reference signal upon reception by the stationary client device received in response to the reference signal. The method also includes determining whether a recalibration criterion has been satisfied based on a comparison of the current power level reported by the stationary client device with the reference value and triggering a second antenna calibration in response to that determination.

In a third illustrative aspect, one or more non-transitory computer-readable media having storing computer-readable instructions embodied thereon that, when executed by a computing device, perform another method of aperiodic antenna calibration triggering in a wireless network is provided. The method includes determining whether a minimum threshold number of BFC mobile devices are present upon completion of an antenna calibration. If the minimum threshold of BFC mobile devices are not present, the method also includes triggering a second antenna calibration in response to a determination that a recalibration criterion is satisfied using a stationary device triggering method until a determination is made that the minimum threshold of BFC mobile devices are present. If the minimum threshold of BFC mobile devices are present, the method also includes triggering the second antenna calibration in response to a determination that the recalibration criterion is satisfied based on a BFC mobile device triggering method until a determination is made that the minimum threshold of BFC mobile devices are not present.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
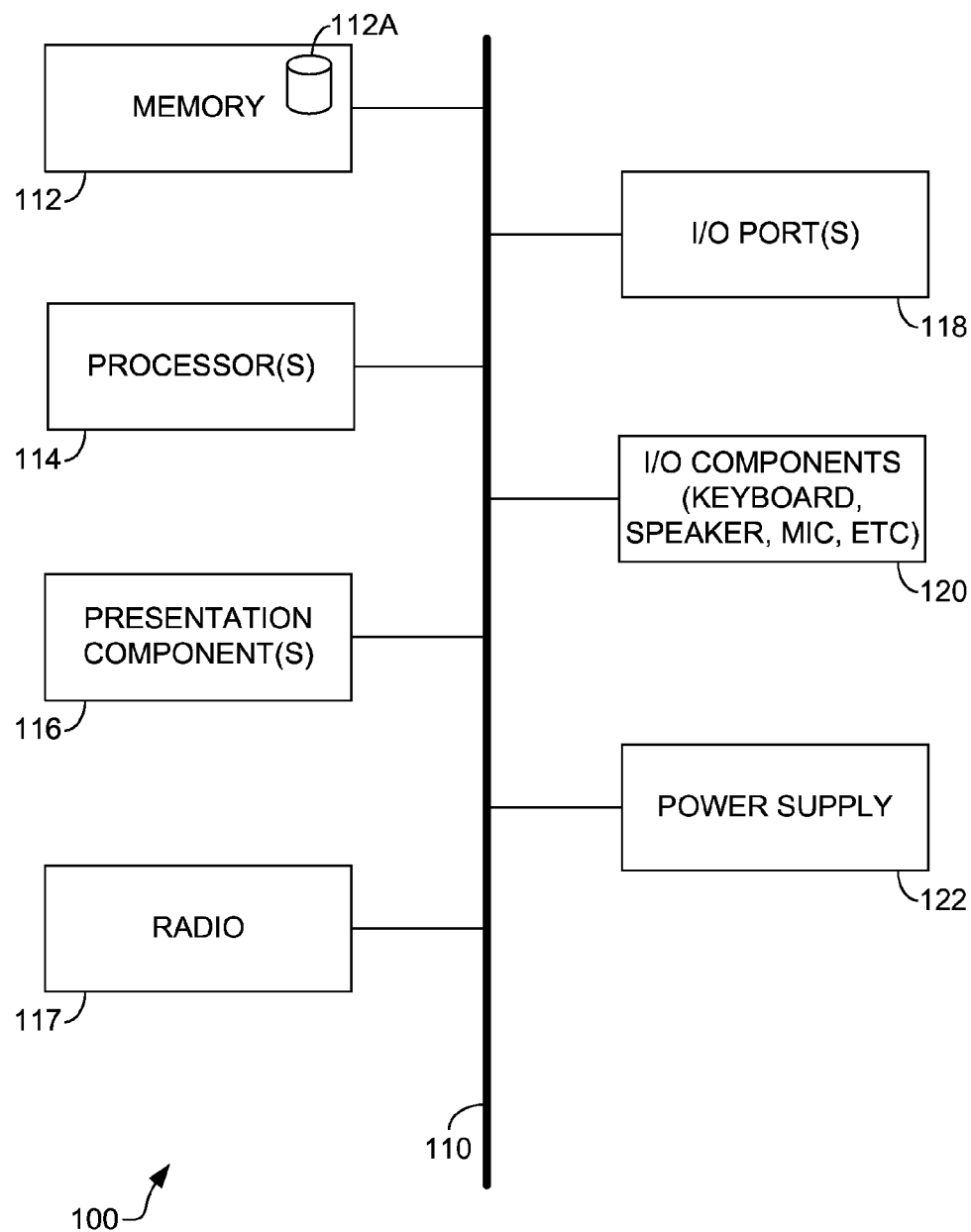
FIG. 1 depicts an exemplary computing device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BF Beam Forming
BFC Beam Forming Capable
BTS Base Transceiver Station
eNodeB Evolved Node B
GBTS Global System for Mobile communications BTS
LNA Low Noise Amplifier
MME Mobility Management Entity
PA Power Amplifier
PDA Personal Data Assistant
POS Point of Sale
RBS Radio Base Station
RF Radio Frequency
RSRP Reference Signal Received Power
S-GW Server Gateway
TDD Time Division Duplex
UE User Equipment
VSWR Voltage Standing Wave Ratio Further, various technical terms are used throughout this description. An illustrative resource that fleshes out various aspects of these terms can be found in Newton's Telecom Dictionary, 27th Edition (2013).

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless-telecommunications technologies include CDMA, EvDO, GPRS, TDMA, GSM, WiMax technology, LTE, LTE Advanced and the like. In some embodiments, radio 117 might also facilitate other types of wireless communications including Wi-Fi®, Bluetooth® communications, GIS communications, and other near-field communications.

Input/output ports 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
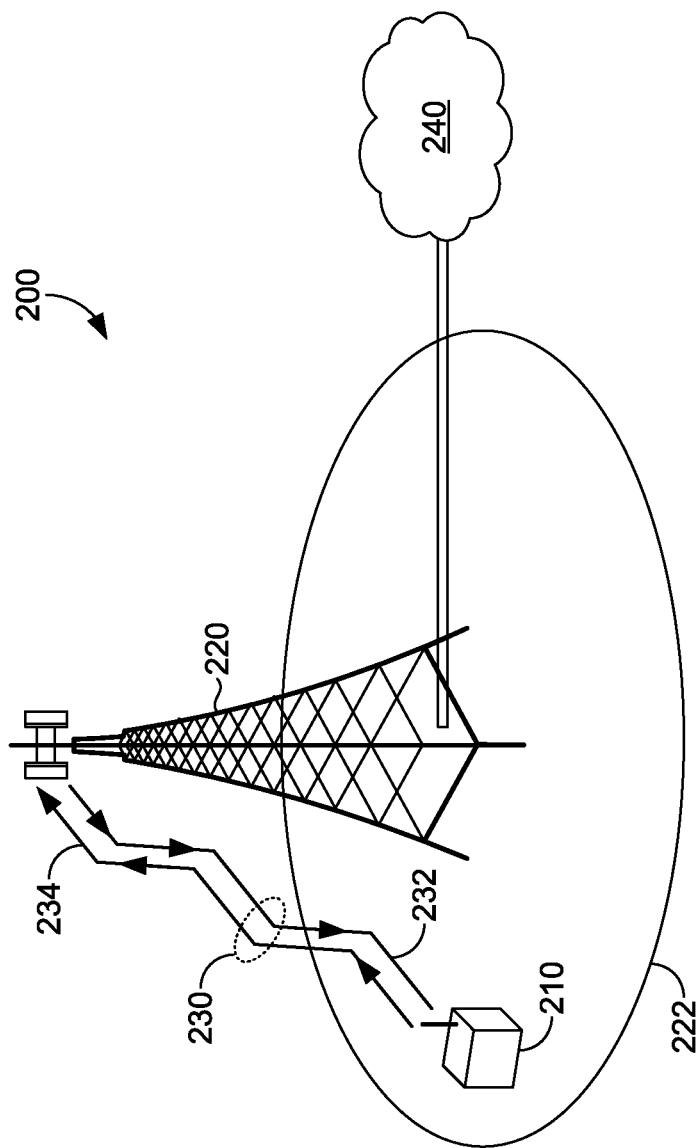
FIG. 2 is a schematic view of an exemplary operating environment suitable for use in implementing embodiments of the present invention.

FIG. 2 provides an exemplary network environment 200 suitable for use in implementing embodiments of the present invention. Such a network environment is illustrated and designated generally as network environment 200. The components shown in FIG. 2 are a few of the components that embodiments of the invention may interact with during operation. The components within FIG. 2 are communicatively coupled to each other in a manner appropriate for carrying out their respective function within the network environment 200. The components shown in FIG. 2 are described in brief and with an emphasis on function for the sake of simplicity. Network environment 200 is but one example of a suitable network environment and is not intended to suggest any limitation as to the scope of use or functionality of the invention. Neither should the network environment 200 be interpreted as having any dependency or requirement relating to any one or combination of components illustrated. Some embodiments of the present invention are described herein in terms of an LTE network for the sake of enablement. However, embodiments are not limited to an LTE network, but rather may include any type of network environment that provides similar functionality to LTE.

In network environment 200, client device 210 may communicate with an access component 220 by way of a communications link 230. Client device 210 may be a wireless terminal that is adapted to receive communications and media over the wireless networks included in network environment 200. Some lower-level details of client device 210 are not shown so as to not obscure embodiments of the present invention. For example, client device 210 may be similar to mobile device 100 of FIG. 1, and thus include a bus that directly or indirectly couples the following devices: memory; one or more processors; one or more presentation components such as a display or speaker; input/output (I/O) ports; I/O components; and a power supply such as a battery. Client device 210 may communicate via wireless protocols, such as code division multiple access ("CDMA"), global system for mobiles ("GSM"), or time division multiple access ("TDMA"), as well as others, to communicate with access component 220.

Client device 210 may take on any of a variety of forms. For example, client device 210 may be either a stationary client device or a mobile client device. A stationary client device may take on the form of a fixed POS, a parking meter, a traffic control device, or any other client device in a substantially fixed geographic location communicatively coupled to network environment 200. A mobile client device may take on a variety of forms, such as a personal computer (PC), a laptop computer, a tablet, a mobile phone, a personal digital assistant (PDA), or any other client device that is not substantially fixed in a particular geographic location and is communicatively coupled to network environment 200.

Client device 210 is capable of communicating with a remote computing device by way of voice and/or data communications via network environment 200. In an embodiment, client device 210 may access data content (e.g. text messages, multimedia messages, emails, calendar updates, web pages, videos, pictures, and the like) over the Internet via network environment 200. For example, client device 210 may stream the video to a video-sharing server that hosts a website through which the videos may be viewed by others. Also, client device 210 may be associated with a user. The user is the person submitting instructions and interacting with client device 210. The exemplary network environment 200 may have any number of client devices; however, one client device 210 is shown for the sake of simplicity.

Access component 220 may also take on any of a variety of forms depending on the wireless protocol implemented in network environment 200. For example, access component may be one or more of a base transceiver station tower (i.e. a base station), an RBS, a GBTS, a NodeB, an eNodeB, a Mobile Hotspot, and any other device that facilitates communication between client device 210 and network 240. In one embodiment, the access component 220 includes both a wireless access component and an eNodeB. In another embodiment, access component 220 is a BTS tower.

Access component 220 may be configured to provide radio resource management, radio bearer control, radio admission control, connection mobility control, and scheduling within its assigned coverage area 222 (e.g. cell). Also, access component 220 may be configured to route user plane data received from client device 210 via communication link 230 to an S-GW (not shown). Access component 220 may be further configured to select an MME (not shown), schedule transmissions within coverage area 222, configure measurement, and transmit broadcast information, paging messages, and/or measurement reports within coverage area 222.

Communication link 230 may represent bidirectional wireless communication paths between client device 210 and access component 220. Communication link 230 may be comprised of a downlink direction 232 and an uplink direction 234. Downlink direction 232 may represent one or more wireless communication paths from access component 220 to client device 210. Uplink direction 234 may represent one or more wireless communication paths from client device 210 to access component 220.

Network 240 may be part of a telecommunication network that connects client devices to their immediate service provider. Therefore, client device 210 may utilize network 240 to communicate with other computing devices (e.g. mobile devices, servers, personal computers, and the like). Also, network 240 can include multiple networks, as well as being a network of networks, but is shown in more simple form so as to not obscure other aspects of the present invention. In embodiments, network 240 can be associated with a telecommunications provider that provides services (e.g. LTE) to client devices, such as client device 210. For example, network 240 may provide voice services to client devices or corresponding client devices that are registered or subscribed to utilize the services (e.g., LTE) provided by a telecommunications provider. Network 240 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In an embodiment, network environment 200, may be a radio access network of a 3GPP LTE telecommunication network, or a portion thereof. As way of background, specifications for LTE provide for, among other things, increased carrying capacity and throughput by utilizing MIMO and beam forming. At a high level, beam forming utilizes multiple antenna columns at an access component (e.g. an eNodeB) to maximize signal power in a particular direction. For example, beam forming may be used by the access component to maximize signal power on a particular client device (e.g. RSRP). In another embodiment, beam forming may be used by access component 220 to maximize signal power on one or more sub-areas within coverage area 222.

Generally, a radiation pattern of an antenna array coupled to an access component implementing beam forming (e.g. access component 220) comprises a pattern of lobes or beams at various angles and directions. Through constructive and destructive interferences of a plurality of radio waves or signals transmitted by a plurality of antenna columns within the antenna array, the signal strength received at different directions from varies spatially. The beam pattern results from this constructive and destructive interference comprised of lobes and nulls. As such, a lobe or beam associated with the antenna array comprises radio waves or signals emitted and/or received in a particular direction or angle. As can be appreciated, the antenna array may emit any number of lobes. For example, the antenna array may simultaneously emit a single lobe, six lobes, or eight lobes.

Furthermore, such lobes may be main lobes, side lobes, or the like. The main lobes may represent a radiation maxima emitted by the antenna array in desired directions. The side lobes may be an artifact of steering the traffic beam and may include unwanted radiation in undesired directions. The side lobe radiation may extend in any direction from the antenna array. Such unwanted radiation from the side lobes may take away energy from the signal directed to the intended position, and/or may affect other users via interference. In certain embodiments, a signal strength representation may not include the side lobes. In alternative embodiments, the signal strength representations may include one or more side lobes. As can be understood, the lobes are associated with a radiated signal strength that may be separated by nulls at which the radiated signal strength falls to or near zero. In aggregate, the lobes may cover any range of space up to 360 degrees. For example, in some embodiments, the lobes may span 65 degrees, 90 degrees, 180 degrees, or 360 degrees in the horizontal plane with respect to the antenna array (i.e. the azimuth plane).

In a downlink direction, the shape and direction of the transmitted radiation pattern may be modified by adjusting the geometry, phase, and/or relative amplitude of the radio waves or signals transmitted by each of the plurality of antenna columns (BF weighting). BF weighting assumes that each antenna column and their respective RF components (transmission path) have uniform transfer functions. BF weighting may similarly be employed in an uplink direction in order to maximize reception in a desired direction while minimizing reception in undesired directions. In reality, mismatches do exist between the different transmission (or reception) paths, and consequently they do not have uniform transfer functions. These mismatches between the transmission paths may exist for any number of reasons.

For example, mismatches may exist due to the physical antenna array structure, such as: mutual coupling effects, tower effects, imprecise placement of the antenna columns, and/or thermal shrinkage/expansion of the antenna cabling. The mismatches may also occur due to variations over time of the RF component's hardware, such as: analog filters, I/Q imbalance, phase or gain mismatches in LNAs and/or PAs, and the like. In order to account for such mismatches, beam forming systems must calibrate antenna arrays to maximize signal power in a particular direction. Such antenna calibration techniques are known to those having ordinary skill in the art, and thus will not be discussed here for the sake of brevity. Conventionally, such antenna calibration techniques to account for mismatches between the transmission (or reception) paths are triggered on a periodic basis.

However, several inherent disadvantages may arise from periodic triggering of antenna calibration. For example, periodic triggering may result in unnecessary antenna calibrations. Since transmission (or reception) activities may require suspension during antenna calibrations, unnecessary calibrations may result in an unnecessary reduction of system efficiency. Also, periodic triggering may not compensate for signal strength variations arising from changing conditions occurring between periodic calibrations. The disclosed method for providing aperiodic antenna calibration triggering in a wireless network may improve overall system performance by addressing these disadvantages. The disclosed method is explained in the context of an LTE radio access network for illustration purposes only. The disclosed method may equally apply to any wireless communication network.

Figure 3:
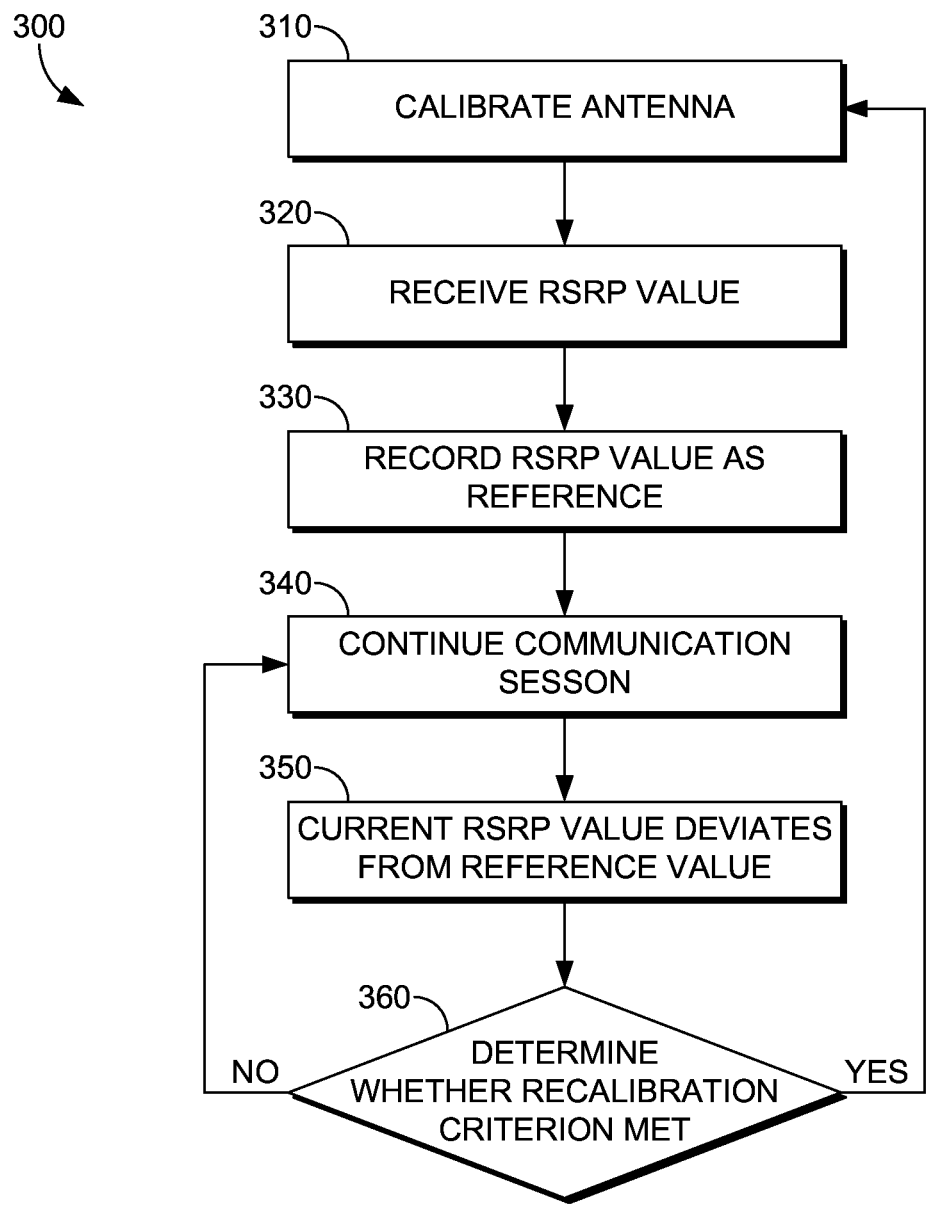
FIG. 3 is a flowchart illustrating an embodiment of a method for providing aperiodic antenna calibration triggering in a wireless network.

FIG. 3 is a flowchart illustrating an embodiment of a method 300 for providing aperiodic antenna calibration triggering in a wireless network (e.g. network environment 200). Method 300 may be performed by an access component (e.g. access component 220 of FIG. 2). In the embodiment of method 300, the access component may be an eNodeB. At step 310, a plurality of antenna elements of a beam forming RF antenna array coupled to the eNodeB are calibrated. At step 320, upon successful completion of the calibration process, the eNodeB transmits an RF signal in a downlink direction to a stationary client device. In response to the RF signal, the eNodeB receives a current RSRP value as measured by the stationary client device. In an embodiment, the stationary client device may be a known distance in a known direction from the eNodeB. In another embodiment, the stationary client device may be an unknown distance and/or direction from the eNodeB.

At step 330, a current RSRP value incident on the stationary client device is recorded as a reference RSRP value. In an embodiment the reference RSRP value is recorded by the stationary client device. In another embodiment, the reference RSRP value is recorded by the eNodeB.

At step 340, the eNodeB continues with standard communication operations. At step 350, the current RSRP value incident on the stationary client device deviates from the reference RSRP value by a predetermined threshold. For example, the predetermined threshold may be set at 10% below the reference RSRP value. In response to this deviation of the current RSRP value, the stationary client device communicates an RSRP measurement report in an uplink direction to the eNodeB. In the example where the predetermined threshold is set at 10%, when the current RSRP value is 10% or lower than the reference RSRP value, the RSRP measurement report is communicated.

At step 360, the eNodeB receives the RSRP measurement report and determines whether the deviation from the reference RSRP value satisfies a preset recalibration criterion. In an embodiment, the preset recalibration criterion is satisfied if the eNodeB has consecutively received a certain number of such RSRP measurement reports. For example, the eNodeB has received five consecutive RSRP measurement reports indicating a current RSRP value deviates from the reference RSRP value by the predetermined threshold. In another embodiment, the preset recalibration criterion is satisfied if the eNodeB has received a certain number of such RSRP measurement reports within a certain duration. For example, the eNodeB has received four such RSRP measurement reports within a five minute period. In another embodiment, the preset recalibration criterion is satisfied if the eNodeB receives a certain number of such RSRP measurement reports within a set interval of RSRP measurement reports. For example, the eNodeB has received three such RSRP measurement reports within the last seven RSRP measurement reports. If the eNodeB determines the preset recalibration criterion is satisfied, method 300 returns to step 310 and the antenna array coupled to the eNodeB is calibrated. If the eNodeB determines the preset recalibration criterion is not satisfied, method 300 returns to step 340.

Method 300 describes a means of aperiodic calibration triggering utilizing a single stationary client device for simplicity. In some embodiments, a plurality of stationary client devices within the eNodeB's assigned coverage area may be used to provide a more uniform representation of current RSRP values within the coverage area. In some embodiments utilizing a plurality of stationary client devices, the eNodeB may average RSRP measurement reports received from the plurality of stationary client devices. In other embodiments utilizing a plurality of stationary client devices, the eNodeB may filter RSRP measurement reports from stationary client devices within a certain range of the eNodeB and/or sub area of its assigned coverage area. In these embodiments, the eNodeB may use the filtered RSRP measurement reports to trigger antenna calibration for the respective range and/or sub area. Furthermore, those skilled in the art will recognize that RSRP is but one means of measuring and/or reporting a signal power level incident on a stationary client device. In some embodiments, a signal power level incident on a stationary client device may be reported using one or more of RSRQ, RSSI, SINR, RSRP, or a combination thereof.

Figure 4:
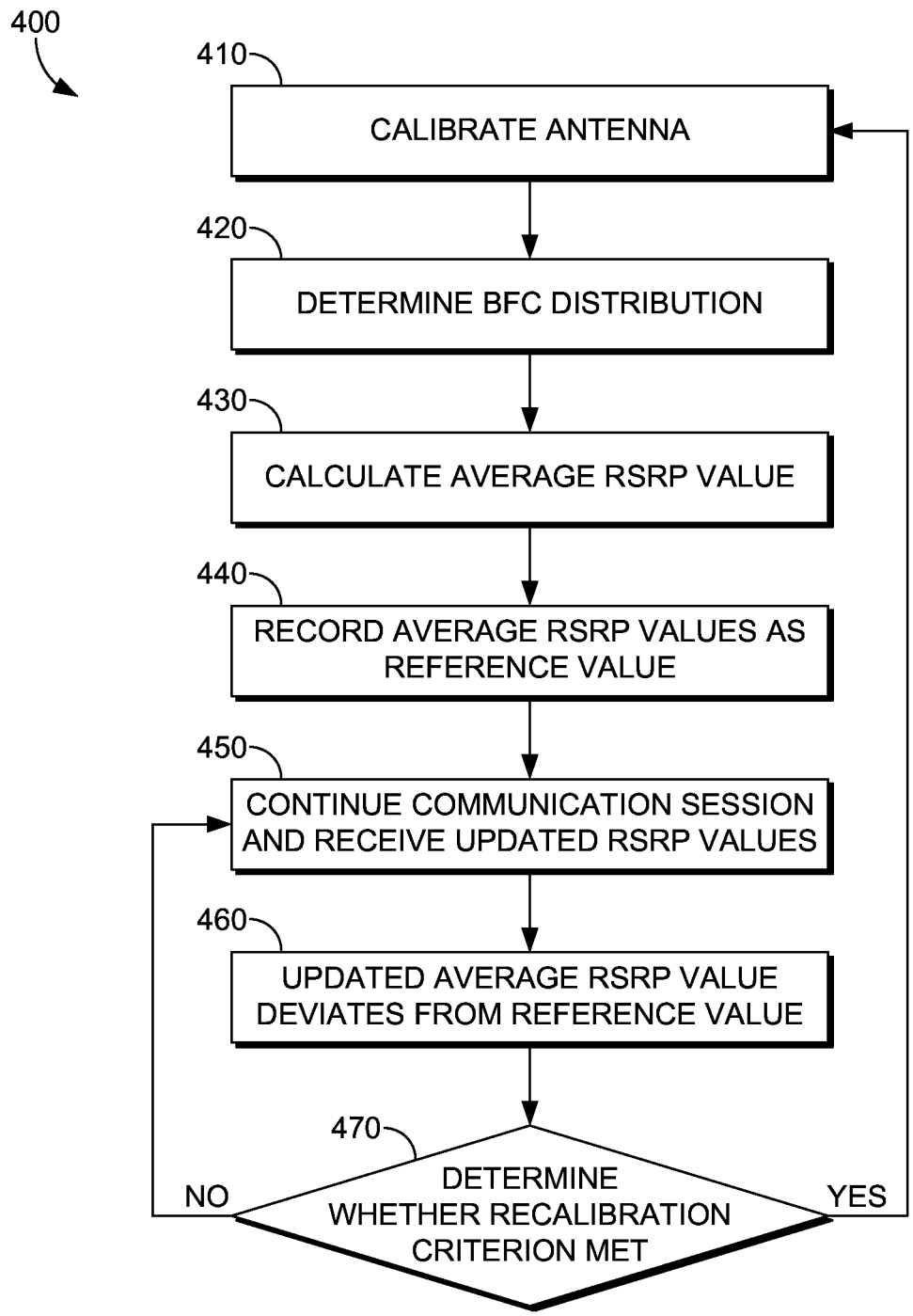
FIG. 4 is a flowchart illustrating an embodiment of a method for providing aperiodic antenna calibration triggering in a wireless network.

FIG. 4 is a flowchart illustrating an embodiment of a method 400 for providing aperiodic antenna calibration triggering in a wireless network (e.g. network environment 200 of FIG. 2). Similar to method 300 of FIG. 3, method 400 may also be performed by an access component (e.g. access component 220 of FIG. 2). In the embodiment of method 400, the access component may also be an eNodeB.

At step 410, a plurality of antenna elements of a beam forming RF antenna array coupled to the eNodeB are calibrated. In an embodiment, an eNodeB implementing method 400 may monitor the number of BFC mobile client devices currently within its assigned coverage. If during method 400 the eNodeB determines that the number of mobile client devices drops below a minimum threshold (e.g. 35 BFC mobile client devices), the eNodeB will trigger a calibration of the antenna array on a conventional periodic basis until the minimum threshold is satisfied and return to step 410. In another embodiment, the eNodeB may further determine whether the number of BFC client devices present within specific distance ranges of the eNodeB satisfies a minimum threshold.

At step 420, upon successful completion of the calibration process, the eNodeB may determine a distribution of BFC mobile client devices within a coverage area of the eNodeB. The eNodeB may determine the distribution based in part on a timing advance reported by each BFC mobile client device within the coverage area.

At step 430, the eNodeB may calculate an average RSRP value within its assigned coverage area. In an embodiment, the eNodeB may filter BFC mobile client devices based upon a calculation of their respective distance from the eNodeB. In this embodiment, the calculation of average RSRP values may be based on an aggregate of current RSRP values reported by BFC mobile client devices and their respective calculated distances from the eNodeB. In this embodiment, the eNodeB may also calculate an average RSRP value within specific distance intervals and/or sub areas of the coverage area. In another embodiment, the eNodeB may discard current RSRP values that represent statistical outliers from the aggregate of current RSRP values (e.g. to avoid measurement errors). For example, current RSRP values that deviate from the aggregate of current RSRP values by a certain number of standard deviations would be statistical outliers. In another example, various methods may be applied to identify statistical outliers, such as, the modified Thompson Tau test, Dixon's Q test, Pierce's criterion, and the like.

At step 440, the eNodeB may record the average RSRP value calculated in step 430 as a reference RSRP value. In an embodiment, the eNodeB may further record the average RSRP value reported by BFC mobile client devices within specific distance intervals and/or sub areas of the coverage area.

At step 450, the eNodeB continues with standard communication operations within its assigned coverage area while receiving updated aggregate RSRP values reported from BFC mobile client devices.

At step 460, an updated aggregate RSRP value may deviate from the reference RSRP value by a predetermined threshold. For example, the predetermined threshold may be set at 15% below the reference RSRP value.

At step 470, in response to this deviation of the updated aggregate RSRP value, the eNodeB determines if a preset recalibration criterion is satisfied. In an embodiment, the preset recalibration criterion is satisfied if the eNodeB has consecutively received a certain number of updated aggregate RSRP values that deviate from the reference RSRP by the predetermined threshold. For example, the eNodeB has received five consecutive updated aggregate RSRP values that deviate from the reference RSRP value by the predetermined threshold. In another embodiment, the preset recalibration criterion is satisfied if a certain number of such updated aggregate RSRP values are received within a certain duration. For example, the eNodeB has received four such updated aggregate RSRP values within a five minute period.

In another embodiment, the preset recalibration criterion is satisfied if the eNodeB receives a certain number of such RSRP measurement reports within a set interval of RSRP measurement reports. For example, the eNodeB has received three such updated aggregate RSRP values within the last seven updated aggregate RSRP values. In an embodiment, the eNodeB may monitor updated aggregate RSRP values within specific distance intervals and/or sub areas of its assigned coverage area. If the eNodeB determines the preset recalibration criterion is satisfied, method 400 returns to step 410 and the antenna array coupled to the eNodeB is calibrated. If the eNodeB determines the preset recalibration criterion is not satisfied, method 400 returns to step 450. Furthermore, those skilled in the art will recognize that RSRP is but one means of measuring and/or reporting a signal power level incident on a mobile client device. In some embodiments, a signal power level incident on a mobile client device may be reported using one or more of RSRQ, RSSI, SINR, RSRP, or a combination thereof.

Figure 5:
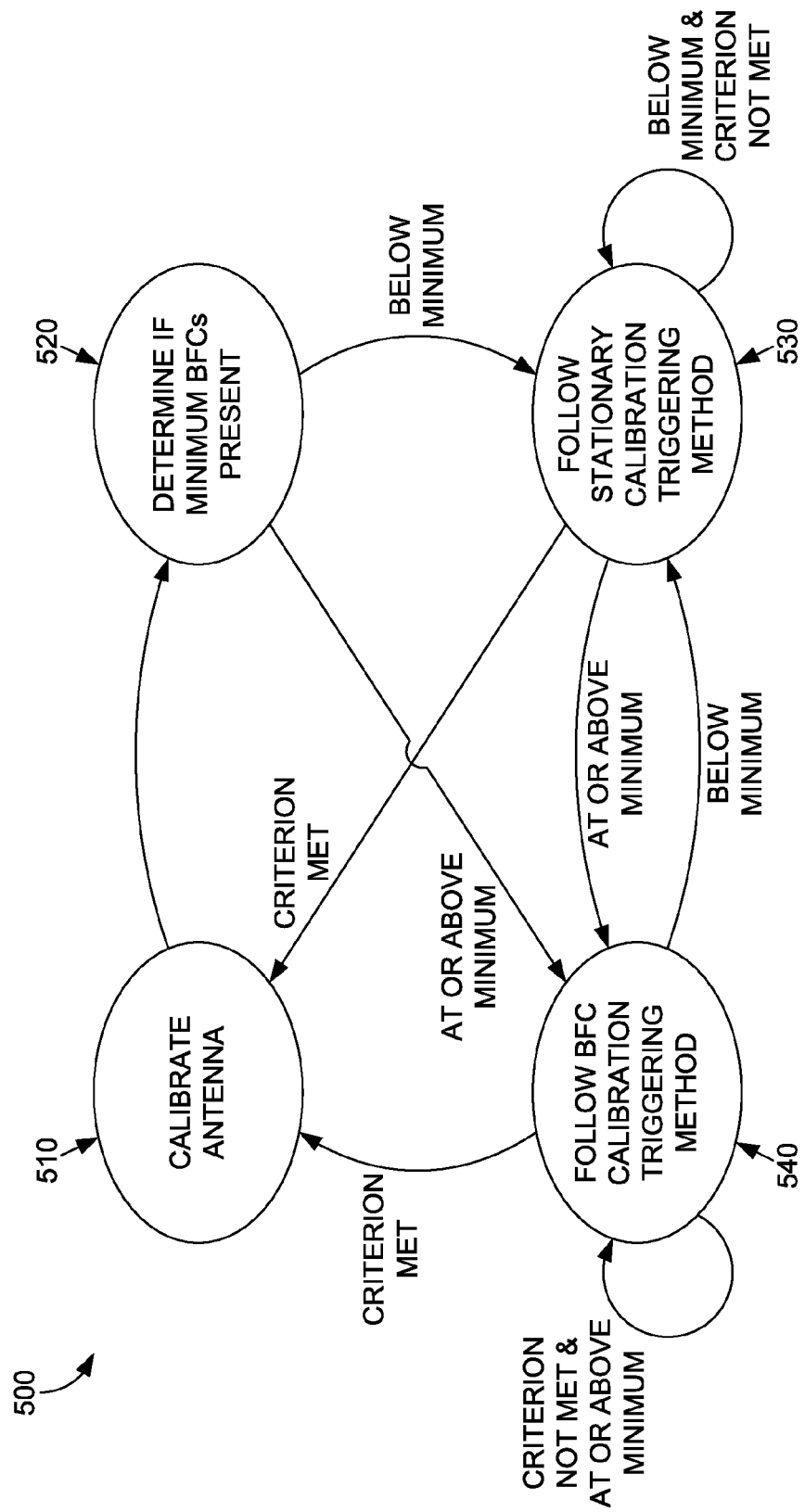
FIG. 5 is an embodiment of a state diagram of a state machine that facilitates providing aperiodic antenna calibration triggering in a wireless network

FIG. 5 is an embodiment of a state diagram of a state machine 500 that facilitates providing aperiodic antenna calibration triggering in a wireless network (e.g. network environment 200 of FIG. 2). State machine 500 may also be implemented by an access component (e.g. access component 220 of FIG. 2). In the embodiment of state machine 500, the access component may be an eNodeB. State machine 500 may initiate at state 510, where a plurality of antenna elements of a beam forming RF antenna array coupled to the eNodeB are calibrated. After calibration is completed, state machine 500 may transition to state 520. At state 520, the eNodeB may determine the number of BFC mobile client devices currently within its assigned coverage. If the eNodeB determines that the number of BFC mobile client devices is below a minimum threshold (e.g. 10 BFC mobile client devices), state machine 500 may transition to state 530. If the eNodeB determines that the number of BFC mobile client devices is above a minimum threshold (e.g. 30 BFC mobile client devices), state machine 500 may transition to state 540.

At state 530, the eNodeB follows an aperiodic antenna calibration triggering protocol using one or more stationary client devices in a manner similar to method 300. The eNodeB may also continue to monitor the number of BFC mobile client devices within its assigned coverage area. If at state 530, the eNodeB determines a preset recalibration criterion has not been satisfied and the minimum number of BFC mobile client devices within its assigned coverage area has not been met, state machine 500 remains in state 530. If at state 530, the eNodeB determines the preset recalibration criterion has been satisfied, state machine 500 transitions to state 510. If at state 530, the eNodeB determines the minimum number of BFC mobile client devices within its assigned coverage area has been met, state machine 500 transitions to state 540.

At state 540, the eNodeB follows an aperiodic antenna calibration triggering protocol using BFC mobile client devices in a manner similar to method 400. The eNodeB may also continue to monitor the number of BFC mobile client devices within its assigned coverage area. If at state 540, the eNodeB determines the number of BFC mobile client devices within its assigned coverage area has not dropped below the minimum threshold, state machine 500 remains in state 540. If at state 540, the eNodeB determines the number of BFC mobile client devices has dropped below the minimum threshold, state machine 500 transitions to state 530. If at state 540, the eNodeB determines the preset recalibration criterion has been satisfied, state machine 500 transitions to state 510.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and sub combinations are of utility and may be employed without reference to other features and sub combinations and are contemplated within the scope of the claims.

The invention claimed is:

1. One or more non-transitory computer-readable media having storing computer-readable instructions embodied thereon that, when executed by a computing device, perform a of method of aperiodic antenna calibration triggering in a wireless network, the method comprising:
   determining that a minimum threshold of beam forming capable (BFC) mobile devices within a wireless coverage area of the wireless network are present upon completion of a first antenna calibration;
   communicating a first reference signal over the wireless coverage area upon determining the minimum threshold of BFC mobile devices are present;

calculating an averaged power level based on a power level report received from each BFC mobile device representing a power level of the first reference signal upon reception by the that BFC mobile device;

storing the averaged power level as a reference value;

upon determining that at least one current power level of a communication session with a BFC mobile device deviates from the reference value by a threshold value, receiving a plurality of measurement reports from each BFC mobile client device having a current power level of a communication session that deviates from the reference value by a threshold value, wherein each of the plurality of measurement reports comprises an indication of the current power level as measured by that BFC mobile device;

calculating a current average power level based on the plurality of measurement reports;

determining that a recalibration criterion has been satisfied based on a comparison of the current average power level with the reference value, wherein the recalibration criterion is satisfied when at least a threshold number of measurement reports are received within a threshold duration; and triggering a second antenna calibration in response to determining that the recalibration criterion is satisfied.

2. The media of claim 1, wherein the method further comprises:

discarding any power level report, prior to calculating the averaged power level, upon determination that the power level report is a statistical outlier; and discarding any measurement report, prior to calculating the current average power level, upon determination that the measurement report is a statistical outlier.

3. The media of claim 1, wherein the method further comprises:

determining a current location within the coverage area for each BFC mobile device based on a timing advance reported by that BFC mobile device;

filtering each power level report based on the current location determined of the respective BFC mobile device prior to calculating the averaged power level; and filtering each measurement report based on the current location determined of the respective BFC mobile device prior to calculating the averaged power level.

4. The media of claim 3, wherein the coverage area comprises a plurality of sub areas, wherein the reference value is calculated on a sub area basis using the power level reports after the power level reports are filtered, and wherein the method further comprises:

calculating a sub area current power for each of the plurality of sub areas based on the measurement reports after the measurement reports are filtered; and determining whether a sub area recalibration criterion is satisfied based on a comparison of the sub area current power with the reference value for the respective sub area.

5. The media of claim 1, wherein the recalibration criteria is satisfied when the current average power level calculated deviates from the reference value by a threshold percentage.

6. The media of claim 1, wherein the method further comprises:

triggering antenna calibrations on a periodic basis upon determining the minimum threshold of BFC mobile devices is not present until a determination is made that the minimum threshold of BFC mobile devices is present.

7. One or more non-transitory computer-readable media having storing computer-readable instructions embodied thereon that, when executed by a computing device, perform a method of aperiodic antenna calibration triggering in a beamforming LTE wireless network, the method comprising:

communicating a first reference signal to a stationary client device within a wireless coverage area upon completion of a first antenna calibration, the stationary client device being at a known distance in a known direction;

storing a reference value representing a power level of the first reference signal upon reception by the stationary client device received in response to the first reference signal;

receiving a plurality of measurement reports during a communication session with the stationary client device, wherein each of the plurality of measurement reports is communicated upon determining that the current power level of the communication session deviates from the reference value by a threshold value and comprises an indication of a current power level of the communication session as measured by the stationary client device;

determining that a recalibration criterion has been satisfied based on a comparison of the current power level indicated in the plurality of measurement reports with the reference value, wherein the recalibration criterion is satisfied when at least a threshold number of measurement reports are received within a threshold duration; and triggering a second antenna calibration in response to determining that the recalibration criterion is satisfied.

8. The media of claim 7, wherein the method further comprises:

communicating a second reference signal to the stationary client device upon completion of the second antenna calibration; and replacing the stored reference value with an updated reference value representing a power level of the second reference signal upon reception by the stationary client device received in response to the second reference signal.

9. One or more non-transitory computer-readable media having storing computer-readable instructions embodied thereon that, when executed by a computing device, perform a method of aperiodic antenna calibration triggering in a wireless network, the method comprising:

determining whether a minimum threshold of beam forming capable (BFC) mobile devices within a wireless coverage area of the wireless network are present upon completion of a first antenna calibration;

upon determining that the minimum threshold of BFC mobile devices are not present, performing a stationary device triggering method, the stationary device triggering method comprising:

communicating a stationary reference signal to a stationary client device, storing a stationary reference value representing a power level of the stationary reference signal upon reception by the stationary client device received in response to the stationary reference signal, receiving a first plurality of measurement reports during a communication session with the stationary client device, wherein each of the plurality of measurement reports comprise an indication of a current power level of the communication session as measured by the stationary client device, determining that a stationary device recalibration criterion has been satisfied based on a comparison of the current power level indicated in the first plurality of measurement reports with the stationary reference value, and triggering a second antenna calibration in response to determining that the stationary device recalibration criterion is satisfied;

monitoring a number of BFC mobile devices presented within the wireless coverage area;

upon determining that the minimum threshold of BFC mobile devices are present, performing a BFC mobile device triggering method; and triggering a third antenna calibration in response to determining that a BFC mobile device recalibration criterion is satisfied using the BFC mobile device triggering method.

10. The media of claim 9, wherein the stationary device recalibration criterion is satisfied when a determination is made that a threshold number of measurement reports are received that deviate from the stationary reference value by a stationary threshold value.

11. The media of claim 9, wherein the BFC mobile device triggering method comprises:

communicating a mobile reference signal over the wireless coverage area upon determining the minimum threshold of BFC mobile devices are present;

calculating an averaged power level based on a power level report received from each BFC mobile device representing a power level of a mobile reference signal upon reception by that BFC mobile device;

storing the averaged power level as a mobile reference value;

receiving a second plurality of measurement reports from each BFC mobile client device, wherein each of the measurement reports comprise an indication of a current power level of a communication session with a respective BFC mobile device as measured by that BFC mobile device;

calculating a current average power level based on the second plurality of measurement reports; and determining that the BFC mobile device recalibration criterion has been satisfied based on a comparison of the current average power level with the mobile reference value.

12. The media of claim 9, wherein the BFC mobile device recalibration criterion is satisfied when a determination is made that a threshold number of measurement reports are received that deviate from the mobile reference value by a mobile threshold value.

* * * * *